No. 627,345. Patented June 20, 1899.
D. McF. MOORE.
GENERATING ELECTRIC WAVES OR VIBRATIONS.
(Application filed Nov. 16, 1896.)
(No Model.)
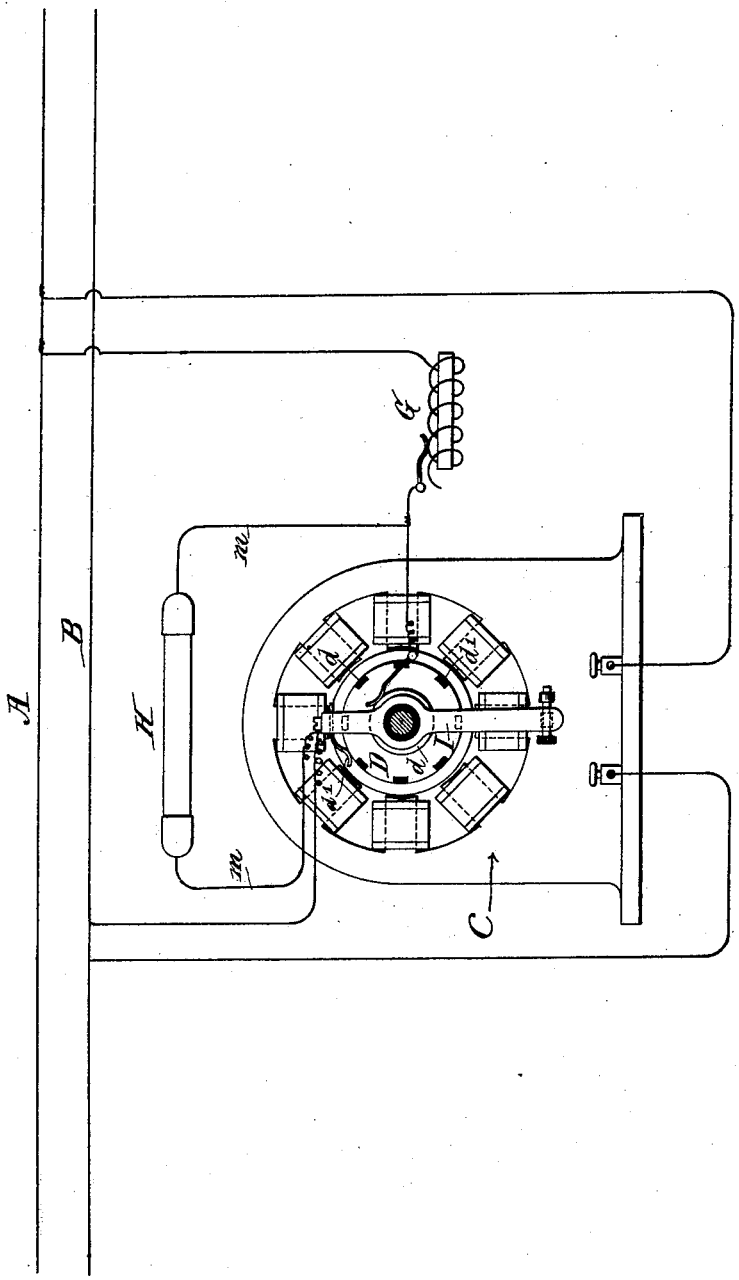
WITNESSES:
Henry T. Hirsch.
Wm. T. Capel.
INVENTOR
Daniel McFarlan Moore
BY
J. C. Townsend
ATTORNEY

UNITED STATES PATENT OFFICE.

DANIEL McFARLAN MOORE, OF NEWARK, NEW JERSEY, ASSIGNOR TO THE MOORE ELECTRICAL COMPANY, OF NEW YORK, N. Y.

GENERATING ELECTRIC WAVES OR VIBRATIONS.

SPECIFICATION forming part of Letters Patent No. 627,345, dated June 20, 1899.

Application filed November 16, 1896. Serial No. 612,340. (No model.)

*To all whom it may concern:*

Be it known that I, DANIEL McFARLAN MOORE, a citizen of the United States, and a resident of Newark, in the county of Essex and State of New Jersey, have invented a certain new and useful Improvement in Generating Electric Waves or Vibrations, of which the following is a specification.

My invention relates to methods of generating electric waves, vibrations, or disturbances suitable for producing luminous effects, Roentgen rays, or other peculiar effects heretofore ordinarily obtained from vacuous receivers having electrodes or terminals connected to the circuit.

My present invention deals with arrangements wherein alternating or other electric currents varying in potential are passed from any suitable prime source through the circuit of self-induction; and it consists, essentially, in interrupting each wave of current at its summit, or when its potential is the highest.

In carrying out this invention I propose to use either a vibratory or a rotary interrupter; but I prefer to employ an interrupter of the latter type because of its more ready adjustment, when employed in connection with a synchronous electric motor, to cause an interruption of the circuit at a determinate point in each wave.

By my present invention alternating electric currents may be used without modification or change by commutators and the maximum effects obtained from the interruption of such current in a circuit of self-induction.

The drawing shows, diagrammatically, an arrangement of apparatus that may be employed for the practice of my invention.

In the drawing, C is an alternating-current motor operated from wires or mains A B, which are supplied with energy from any suitable source and are connected to the terminal binding-posts of the machine, as shown. The accessories or appliances, if any, to be used in the shape of collector rings and brushes, starting devices, commutators, or additional circuits of different phase for the purpose of bringing the motor up to a speed synchronous with the alternations are omitted, as they form no part of my invention.

The interrupter, in the case of the rotary type, is typified at D, and comprises a circuit-interrupter wheel $d$, mounted on the shaft of the machine, a contact-arm $d'$, adapted to engage therewith, a supporting circumferentially-adjustable rocker-arm I, carrying arm $d'$ and stationary with reference to the shaft and preferably insulated therefrom, and a circuit-spring bearing on the hub of wheel $d$ to complete the connection through the interrupter. When the motor is brought to synchronous speed, there will obviously be the same number of whole alternations for each whole revolution of the motor, and by the circumferential adjustment the interrupter may be caused to break the circuit through itself at a determinate portion of each wave or phase of the alternating current which drives the motor, and hence of each wave or phase of the current through the interrupter if the rate of alternations in the circuit of the latter be the same as that of the current driving the motor. Thus, for instance, if there be eight breaks in the circuit-interrupting wheel and eight alternations of current for each whole revolution of the wheel—that is to say, eight periods in which the current gradually rises from its zero to its maximum and falls back to zero—the position of the brush upon the wheel will determine the instant at which in each of these periods the current-wave shall be interrupted.

The circuit of self-induction through the interrupter may be taken as a branch from the circuit A B or may be otherwise supplied with alternations or waves of the same rate, and for the purpose of heightening its self-induction and the potential of its discharge when interrupter may include a self-induction coil, (indicated at G,) which, if desired, may be adjustable as to its amount of self-induction. The circuit into which said circuit discharges on interruption is indicated at $m\ m$. This circuit I term the "work-circuit" as it is the one by which, directly or indirectly, the discharges from the circuit are employed to produce the luminous or similar effects, as well understood in the art.

In the present case a vacuous receiver H is shown, having its terminals, consisting of metal caps on an exhausted glass tube, connected to the terminals of the circuit.

The artificial discharge from the interrupted circuit may be obviously heightened by organizing or constructing it in other ways than with a self-inductive coil.

I do not limit myself to the use of a rotary interrupter, but prefer the same to a vibratory one, owing to the difficulty of adjusting and maintaining the rate of vibration of the latter at synchronism with the alternations of the current.

I do not limit myself to operating the interrupter in the open air, since, as now well understood in the art, the contacts might be inclosed in an exhausted receiver. It will also be understood that by adjusting the position of the interrupter the intensity of the effects may be varied or regulated as desired.

What I claim as my invention is—

The herein-described improvement in generating electric waves, vibrations or disturbances suitable for producing luminous effects, Roentgen rays and the like, by interrupting a circuit of self-induction carrying a varying current, consisting in timing the interruptions to take place at or about the maximum of each wave of said varying current, as and for the purpose described.

Signed at New York, in the county of New York and State of New York, this 23d day of October, A. D. 1896.

DANIEL McFARLAN MOORE.

Witnesses:
WM. H. CAPEL,
D. H. DECKER.